No. 629,400.  
H. J. SMITH.  
GAS WASHER.  
(Application filed Sept. 29, 1898.)  
Patented July 25, 1899.

(No Model.)

Witnesses:

Inventor:  
Harry J. Smith  
by his atty.

UNITED STATES PATENT OFFICE.

HARRY J. SMITH, OF PHILADELPHIA, PENNSYLVANIA.

GAS-WASHER.

SPECIFICATION forming part of Letters Patent No. 629,400, dated July 25, 1899.

Application filed September 29, 1898. Serial No. 692,178. (No model.)

*To all whom it may concern:*

Be it known that I, HARRY J. SMITH, a subject of the Queen of Great Britain and Ireland, residing in the city and county of Philadelphia, in the State of Pennsylvania, have invented a certain new and useful Improvement in Gas-Washers, of which the following is a true and exact description, reference being had to the accompanying drawings, which form a part thereof.

My invention relates to the washing of gas, and is especially designed for such gases as are produced as a by-product in coke-ovens, although adapted for advantageous use with gases from all producers.

The object of my invention is to provide a washer which in simple and compact form will provide for a thorough washing of the gas, and the nature of my improvements will be best understood as described in connection with the drawings, in which they are illustrated, and in which—

Figure 1:
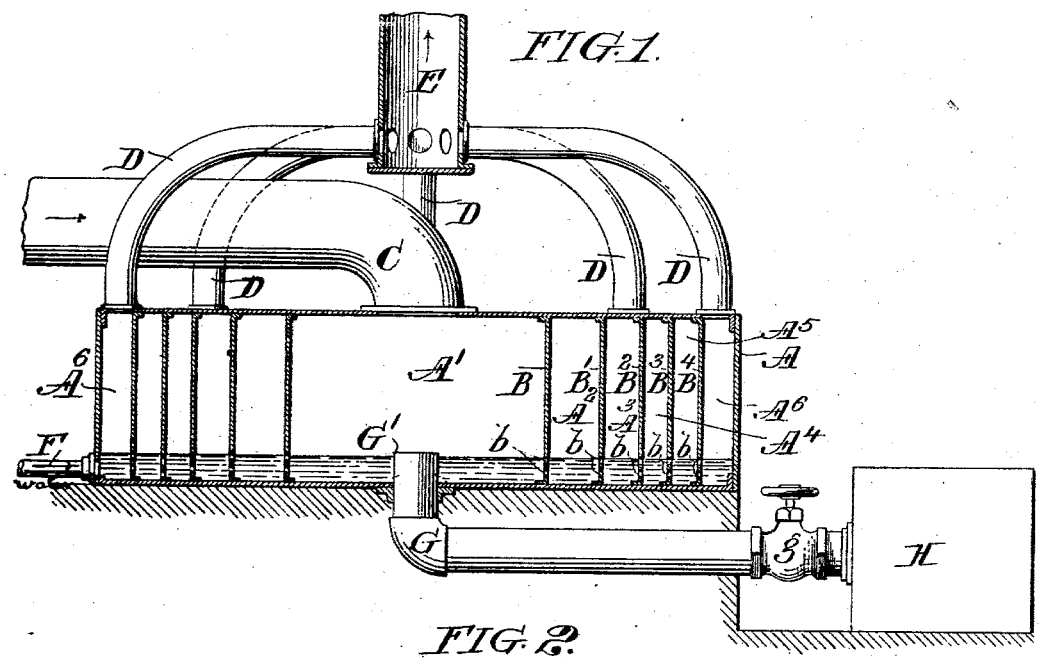
Figure 2:
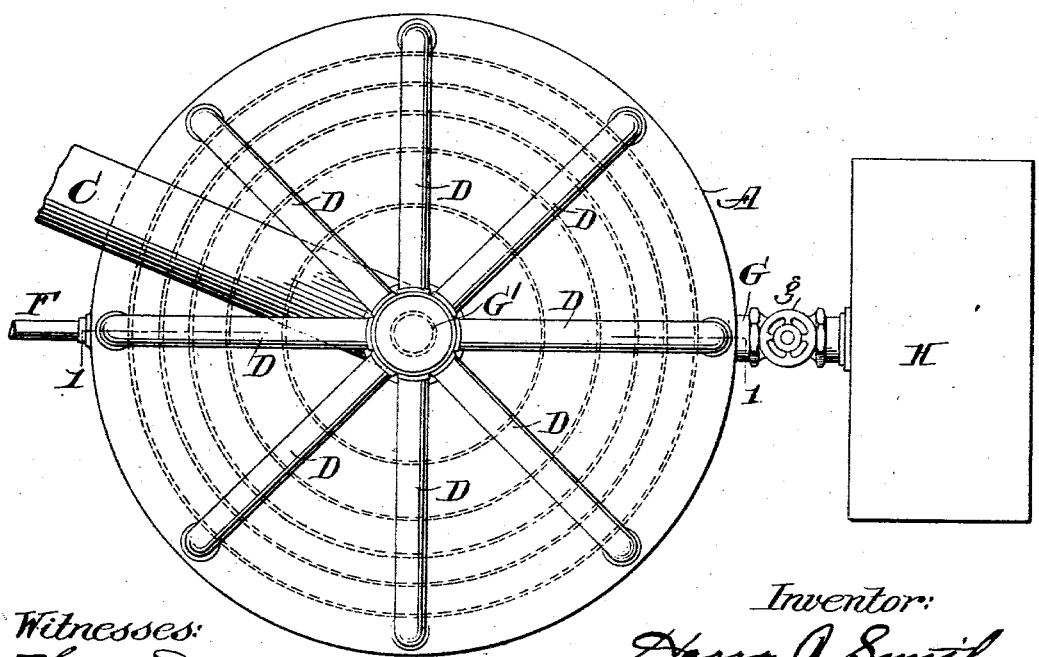

Figure 1 is a sectional elevation of my washer, taken as on the section-line 1 1 of Fig. 2; and Fig. 2 is a plan view of the washer.

A is the outer case of the washer, which is divided into a series of concentric chambers $A'$ $A^2$ $A^3$, &c., by means of partitions B B' $B^2$, &c., the chambers communicating with each other through perforations symmetrically disposed around the lower portions of the partitions, as indicated at $b$ $b$, &c.

C indicates a gas-inlet pipe leading into the central chamber $A'$, and D D D symmetrically-disposed gas take-off pipes leading from the outermost chamber $A^6$ and communicating with a take-off main E.

F is an inlet-pipe for water leading into the outermost chamber $A^6$, and G is an outlet-pipe for the water leading from the innermost chamber $A'$ and extending out, as indicated at G', so that its opening into the chamber will be at a level higher than the perforations $b$. The outlet-pipe G leads into a receptacle H, where the liquors are collected, a valve $g$ permitting the pipe G to be opened or closed at will.

In operation the gases enter the chamber $A'$ and the water enters the chamber $A^6$. By means of a forcing device connected with the conduit C or a suction device connected with the conduit E the gases are caused to pass successively from the chamber $A'$ to the chamber $A^2$ and thence to the chamber $A^3$, &c., until they reach the outermost chamber $A^6$ and are drawn through the pipes D into the conduit E. The water-level in all the chambers being above the perforations $b$, the gases are compelled to pass through the water in passing from one chamber to the other and are thus thoroughly washed. The symmetrical disposition of the perforations $b$ and the take-off pipes D cause the flow of gas to be from the center outward in all directions, and obviously the exposure of the gases in passing through the water becomes relatively greater as it passes from the inner to the outer chambers. It will also be seen that the water flowing in from the pipe F to the chamber $A^6$ will pass from said annular chamber inward to the chamber $A'$, the water flowing in the opposite direction to the flow of gases, which is highly desirable, and the highly-charged water reaching the central chamber being drawn off into the receptacle H.

While for the reasons pointed out above I prefer that the gas shall flow first to the chamber $A'$ and the water first to the chamber $A^6$, it is obviously practicable to reverse the direction of flow in both cases or either case, and my apparatus will still be a meritorious one so used, although its full advantage would not be availed of.

Having now described my invention, what I claim as new, and desire to secure by Letters Patent, is—

1. A gas-washer consisting of a series of concentric chambers $A'$ $A^2$ $A^3$, &c., separated by partitions and connected only by perforations extending around the lower parts of the said partitions, gas inlet and outlet conduits connecting the one with the inner and the other with the outer chambers and water inlet and outlet conduits connected also with the inner and outer chambers and so as to cause a flow of water through the series in the opposite direction to the flow of gas, the outlet-conduit opening into the chambers at a level above that of the perforations connecting said chambers so as to maintain the normal water-level above the perforations and insure the passage of gas through the water.

2. A gas-washer consisting of a series of concentric chambers A' A² A³, &c., separated by partitions and connected by perforations extending around the lower parts of the said partitions, a gas-inlet conduit entering the central chamber, a series of symmetrically-disposed gas-exit conduits connected with the outer chamber, a water-inlet connected to the outer chamber and a water-outlet leading from the central chamber at a level above that of the perforations connecting the chambers with each other.

H. J. SMITH.

Witnesses:
CHAS. F. MYERS,
D. STEWART.